US012207677B2

(12) United States Patent
Sanchez Vila

(10) Patent No.: US 12,207,677 B2
(45) Date of Patent: Jan. 28, 2025

(54) SHEET ROLLING DEVICE

(71) Applicant: REPUBLIC TECHNOLOGIES (NORTH AMERICA) LLC, Glenview, IL (US)

(72) Inventor: Santiago Sanchez Vila, Barcelona (ES)

(73) Assignee: REPUBLIC TECHNOLOGIES (NORTH AMERICA) LLC, Glenview, IL (US)

( * ) Notice: Subject to any disclaimer, the term of this patent is extended or adjusted under 35 U.S.C. 154(b) by 0 days.

(21) Appl. No.: 18/469,090

(22) Filed: Sep. 18, 2023

(65) Prior Publication Data

US 2024/0090567 A1 Mar. 21, 2024

(51) Int. Cl.
*B31C 1/08* (2006.01)
*A24C 5/40* (2006.01)
*A24D 3/02* (2006.01)

(52) U.S. Cl.
CPC .............. *A24D 3/0245* (2013.01); *A24C 5/40* (2013.01); *B31C 1/083* (2013.01)

(58) Field of Classification Search
CPC .... B31C 1/00; B31C 1/02; B31C 1/04; B31C 1/08; B31C 1/083
USPC .......................................................... 493/304
See application file for complete search history.

(56) References Cited

U.S. PATENT DOCUMENTS 9,943,102 B1 * 4/2018 Bohl, Sr. ................ A24C 5/465

FOREIGN PATENT DOCUMENTS

| | | | | |
|---|---|---|---|---|
| FR | 386590 A | * | 6/1908 | ............... A24D 3/02 |
| GB | 2 023 400 A | | 1/1980 | |
| WO | WO 2016/194010 A1 | | 12/2016 | |

OTHER PUBLICATIONS

ER Search Report as issued in French Patent Application No. 2209433, dated May 12, 2023.

* cited by examiner

*Primary Examiner* — Jacob A Smith
(74) *Attorney, Agent, or Firm* — Pillsbury Winthrop Shaw Pittman LLP

(57) ABSTRACT

A device for rolling a sheet includes a main casing which extends between a front face and a rear face and includes a cap which includes a first receiving slot, a sliding element translationally movably mounted in the main casing, from the front face of the casing and including a shell including a second receiving slot, a rotary element rotatably movably mounted and including a shaft housed inside the main casing, from the rear face of the casing, the shaft including an open third receiving slot, and a stop surface. In the closed position of the rolling device, the first and second slots are aligned along the same vertical plane.

15 Claims, 10 Drawing Sheets

[Fig. 1]
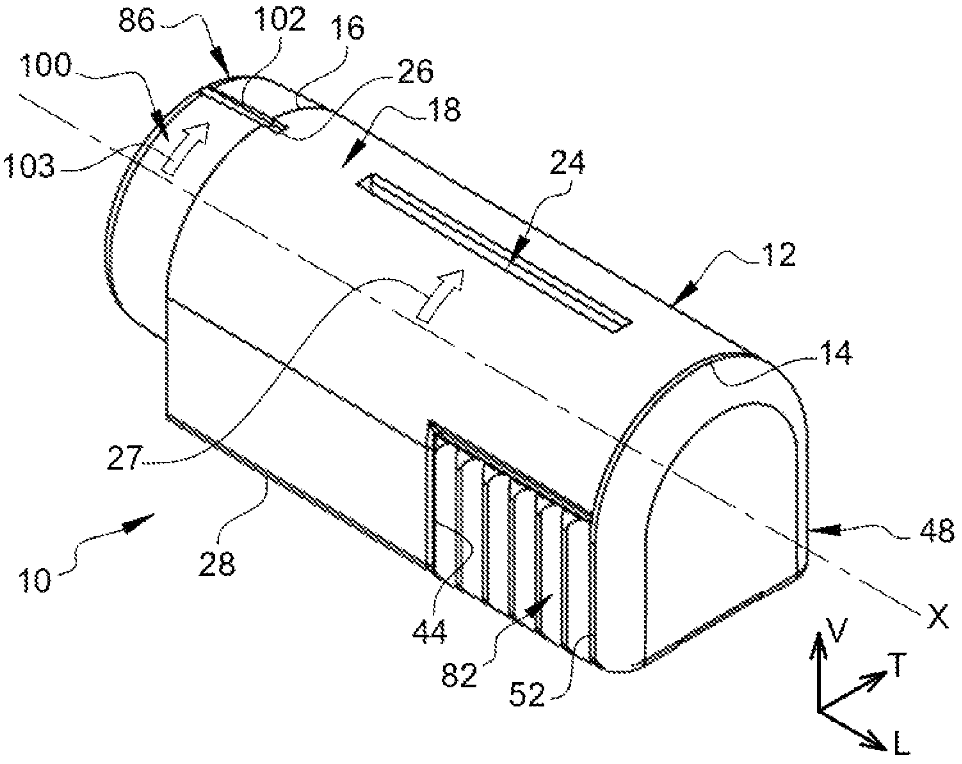

[Fig. 2]
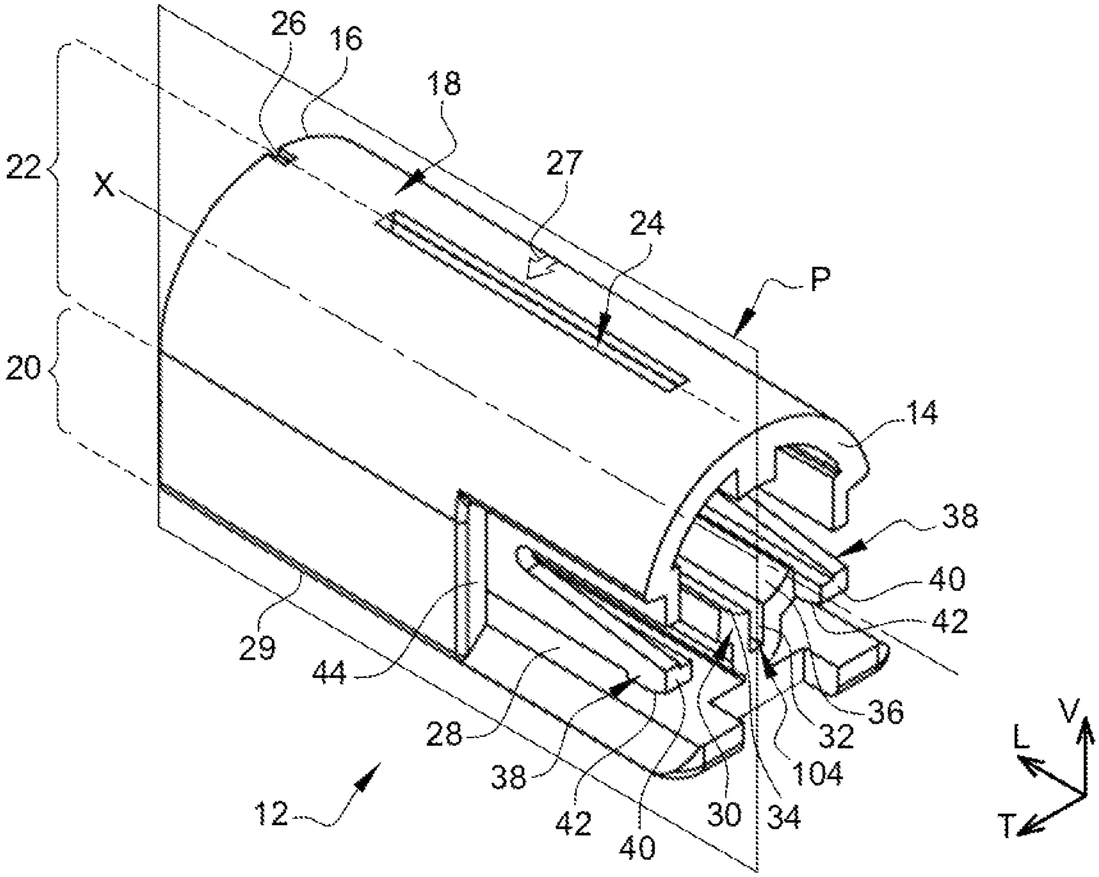

[Fig. 3]
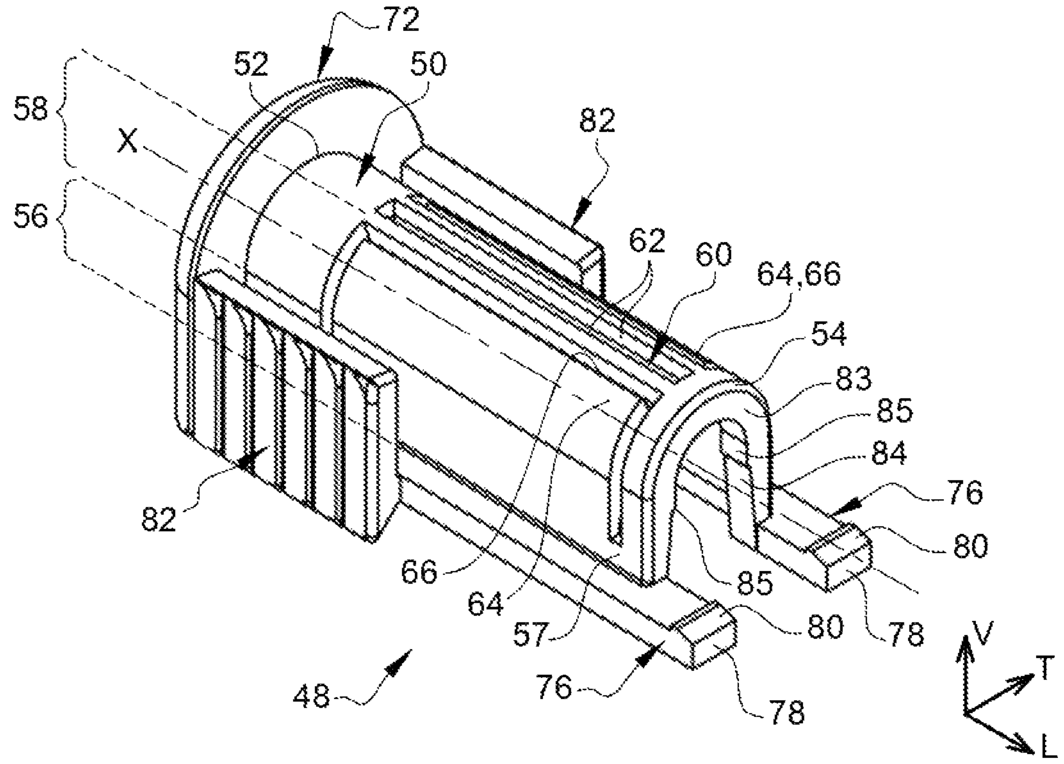

[Fig. 4]
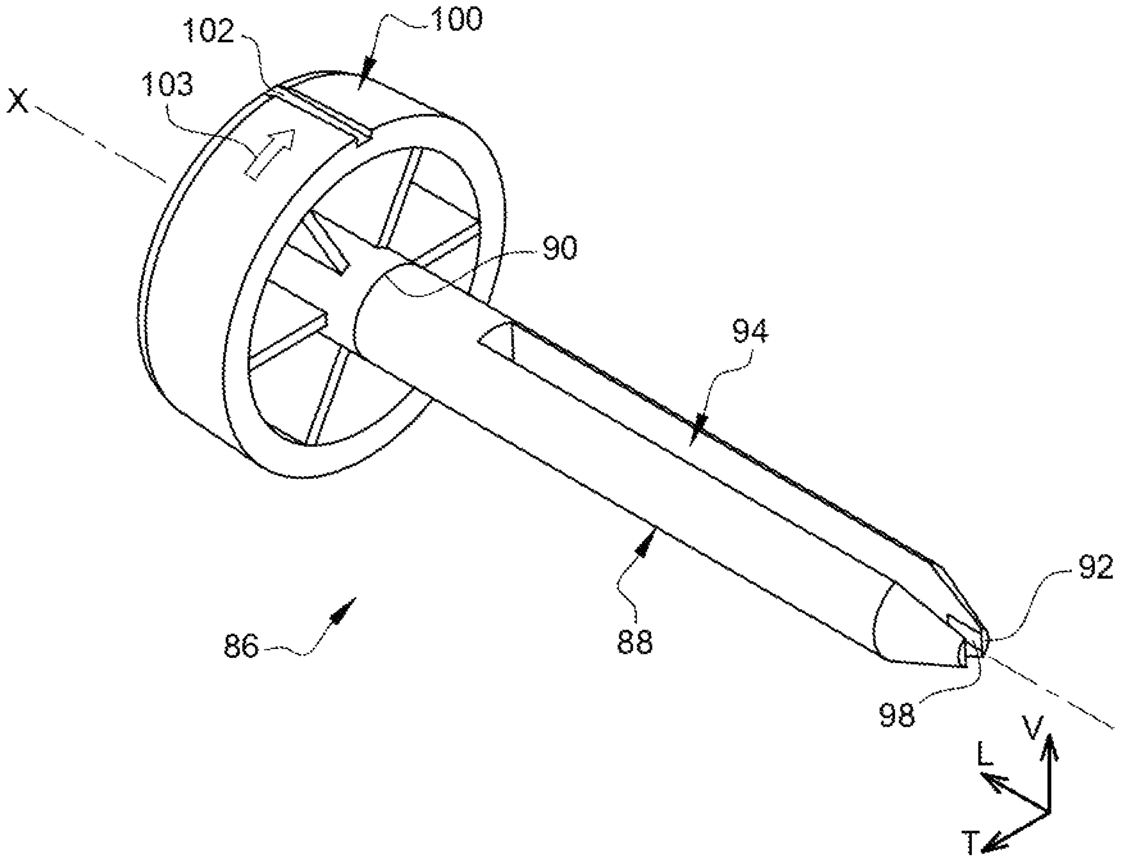

[Fig. 5]
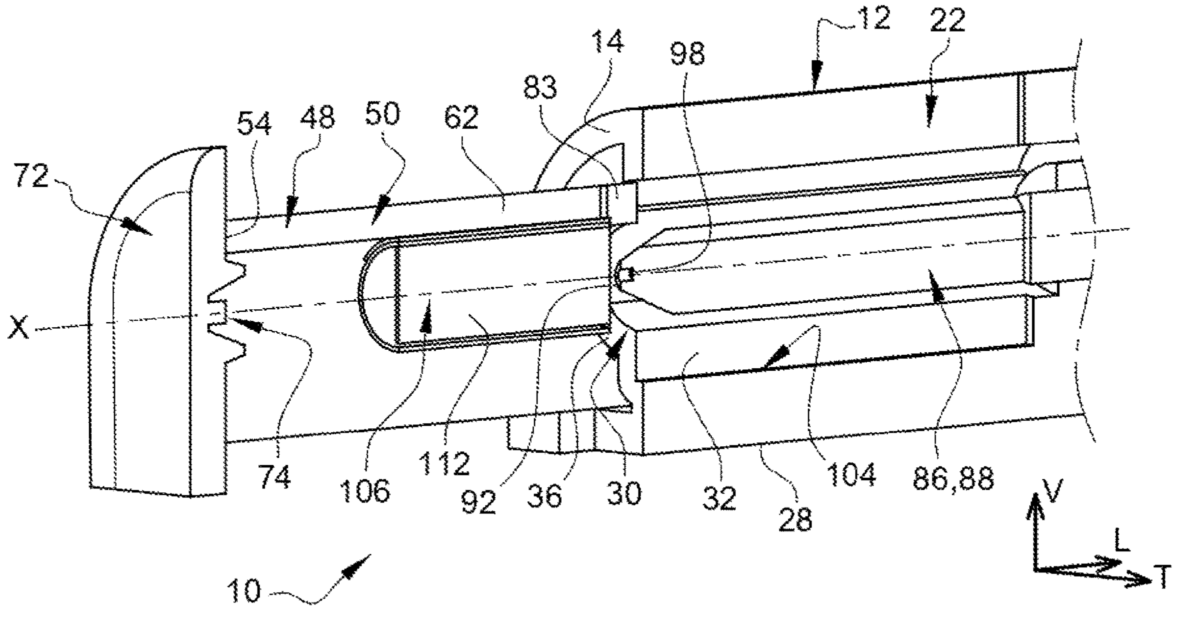

[Fig. 6]
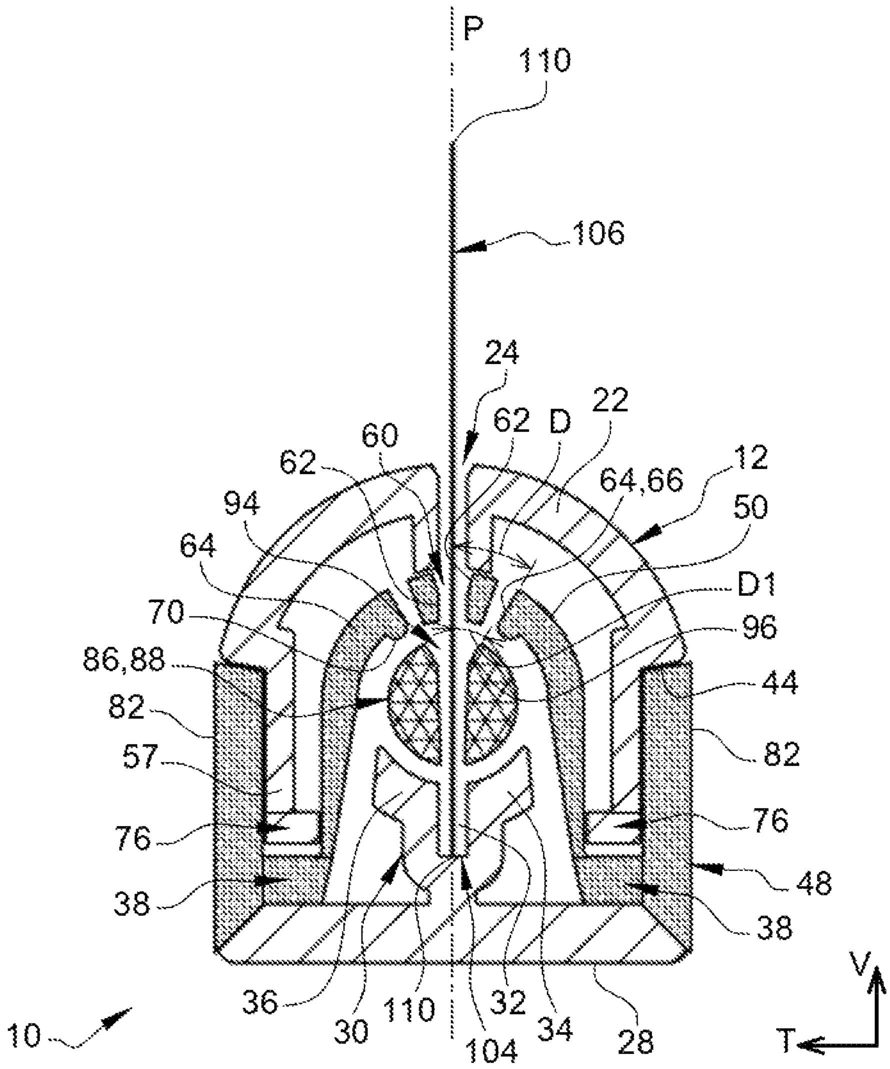

[Fig. 7]
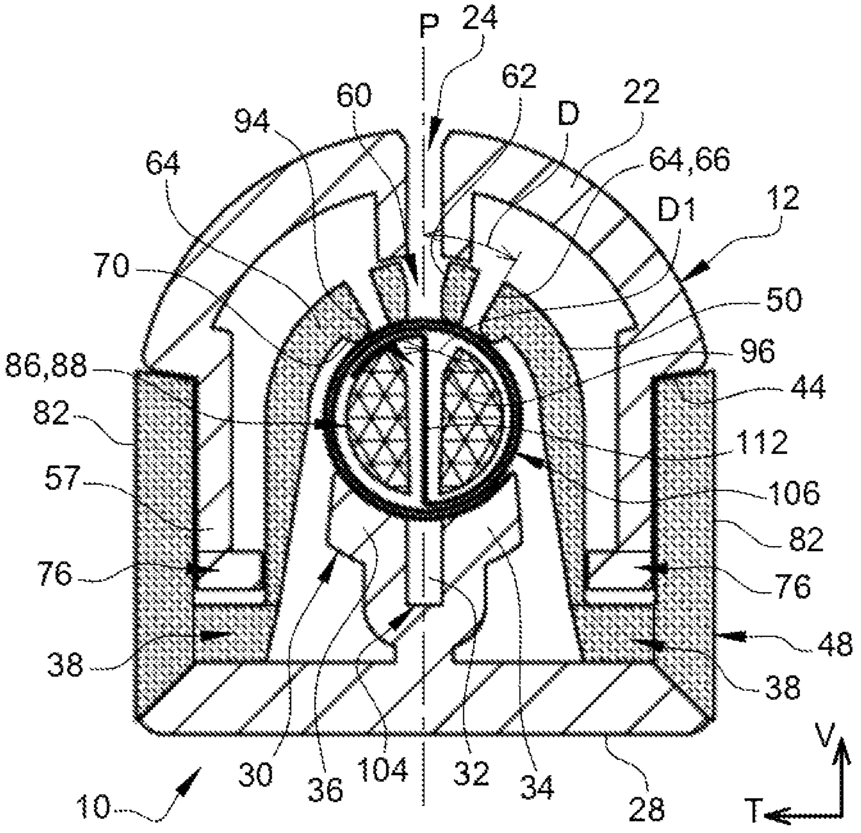

[Fig. 8]
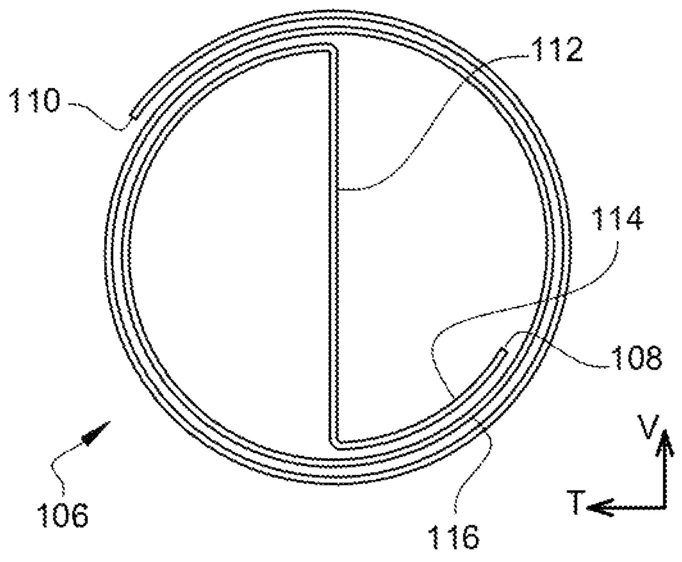

[Fig. 9]
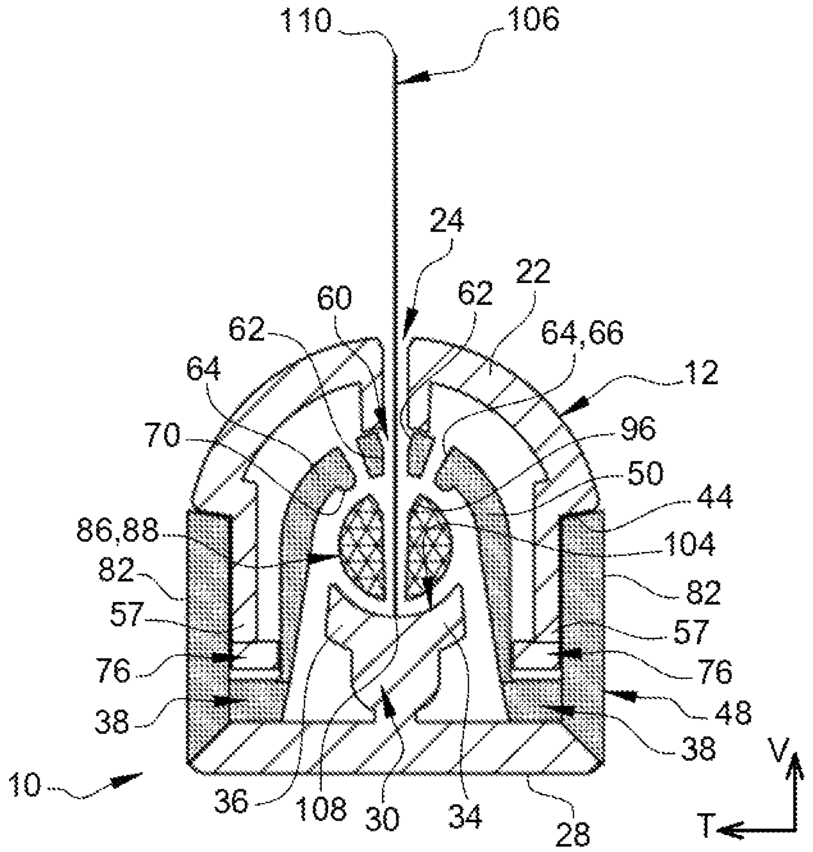

[Fig. 10]
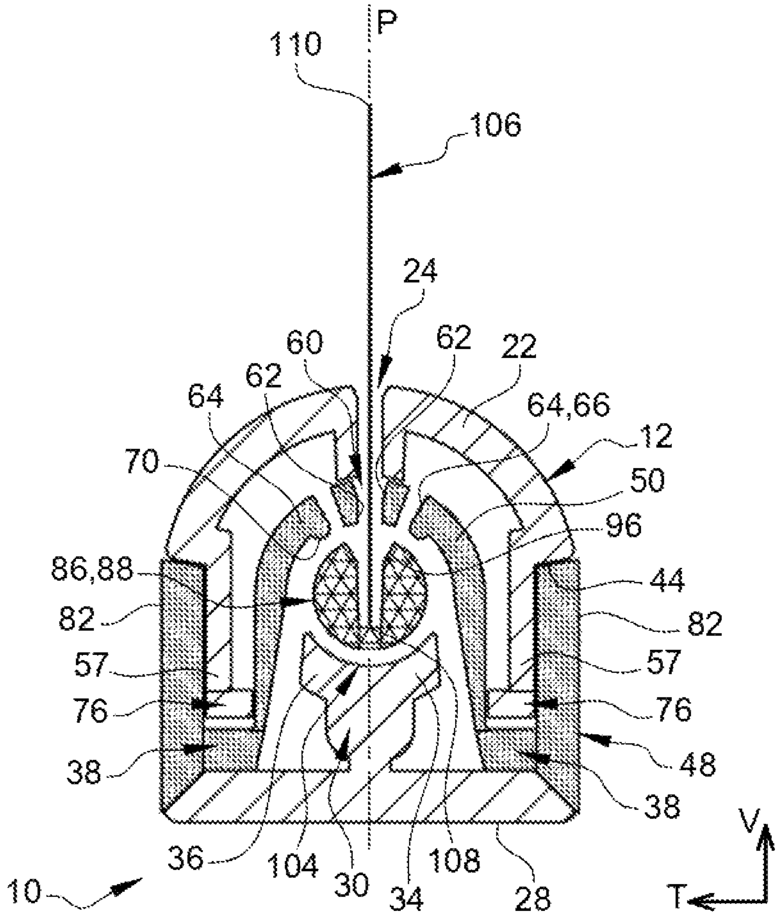

SHEET ROLLING DEVICE

CROSS-REFERENCE TO RELATED APPLICATIONS

This application claims priority to French Patent Application No. 2209433, filed Sep. 19, 2022, the entire content of which is incorporated herein by reference in its entirety.

TECHNICAL FIELD OF THE INVENTION

The present invention relates to the field of smoking articles and in particular roll-your-own cigarettes.

The present invention relates more particularly to a device for rolling a sheet of paper or cardboard for a roll-your-own cigarette and a method for rolling a sheet.

TECHNOLOGICAL BACKGROUND OF THE INVENTION

Conventionally, making a cigarette filter is performed manually by winding a strip of paper or cardboard forming the peripheral part of the filter, which has a cylindrical or conical shape. Winding the strip of paper can be preceded by a step of folding the sheet to form a central part comprising one or more internal partitions. This type of filter has a better filtering capacity.

There are devices for filling and rolling a roll-your-own cigarette equipped with rollers for winding the sheet of paper about the filling.

However, this type of device is not adapted to rolling a sheet of paper or cardboard for making a filter for roll-your-own cigarettes, especially if a rolled sheet with improved filtering capacity is desired.

SUMMARY OF THE INVENTION

The invention provides a solution for rolling a sheet by providing a rolling device and a method for rolling a sheet of paper or cardboard.

A first aspect of the invention relates to a rolling device for a sheet of paper or cardboard including:

- a main casing which extends along a longitudinal axis X between a front face and a rear face and comprising an external cap which includes a first receiving slot,
- a sliding element translationally movably mounted along the longitudinal axis X in the main casing, from the front face of the main casing, between an open position and a closed position of the main casing, the sliding element comprising:
  - a shell which extends along the longitudinal axis X between a front edge and a rear edge and comprising a rounded upper portion including a second receiving slot, and
  - a wall for closing the front face of the main casing
- a rotary element rotatably movably mounted along the longitudinal axis X and comprising:
  - a cylindrical shaft delimited between a first and a second end and housed inside the main casing, from the rear face of the main casing, the shaft including a third receiving slot open up to its second end, and
  - an adjustment wheel integral with the first end of the shaft,
- a stop surface.

In the closed position of the rolling device:

- the first and second receiving slots are aligned along a same vertical plane P comprising the longitudinal axis X,
- the second receiving slot is arranged between the first receiving slot and the shaft of the rotary element along a vertical axis V, and
- the rounded upper portion of the shell of the sliding element is arranged opposite the shaft of the rotary element.

The rolling device according to the invention is a hand-held apparatus having a small overall size and making it possible to obtain a sheet of paper or cardboard rolled to a predetermined diameter. The use of a rolling device makes it possible to improve quality of rolling and to standardise geometry of the rolled sheets.

Further to the characteristics just discussed in the preceding paragraph, the rolling device has additional characteristics:

- the third receiving slot of the rotary element is a radial through slot to allow a sheet to be introduced through this slot,
- it comprises a support including the stop surface facing the first slot against which a sheet previously introduced into the first receiving slot abuts,
- it comprises a support in which a holding groove including the stop surface facing the shaft of the rotary element is arranged, and the holding groove is aligned with the first and second receiving slots along the same vertical plane P to ensure that a sheet is held in position at start of rolling,
- the third receiving slot of the rotary element extends only along a portion of the diameter of the shaft of the rotary element and includes the stop surface, according to this alternative to the preceding characteristic, the stop surface is directly integrated into the third receiving slot,
- the closing wall of the sliding element includes a stud cooperating with a blind hole arranged at the second end of the shaft of the rotary element, and the stud and the hole are aligned along the longitudinal axis X to hold the shaft of the rotary element in position and facilitate rotation of the rotary element,
- the main casing includes at least one first guide rail for translational guiding along the longitudinal axis X cooperating with at least one second guide rail of the sliding element to allow translation of the sliding element in the main casing between an open position and a closed position of the main casing,
- at least one of the first and second guide rails includes an abutment for translational blocking designed to stop the translation of the sliding element in the main casing in the open position of the main casing,
- the shell of the sliding element includes at least one elastic blade comprising a free end arranged opposite the shaft of the rotary element to hold a sheet bearing against the shaft of the rotary element during rolling,
- the second slot of the sliding element is delimited by two longitudinal sides, and the free end of the elastic blade forms one of the two longitudinal sides of the second receiving slot, the third receiving slot is formed directly by a cut-out of the shell, which simplifies geometry of the shell of the sliding element,
- the free end of the elastic blade is at an angular distance D in the ]0-45[ degrees interval relative to the vertical plane P,

- the main casing and the rotary element each have a positioning mark, and when the marks are aligned, the third receiving slot of the rotary element is aligned with the first and second receiving slots along the same vertical plane P,
- the rear edge of the shell of the sliding element comprises a shoulder which extends radially towards the longitudinal axis X and whose inner diameter is equal to the diameter of the shaft of the rotary element in order to pull a rolled sheet about the shaft of the rotary element during translation of the sliding element in the main casing towards the open position of the main casing until the sheet exits from the shaft of the rotary element, and
- the shell of the sliding element includes an open lower portion provided for expelling a rolled sheet from the rolling device.

A second aspect of the invention relates to a method for rolling a sheet of paper or cardboard with the use of a rolling device according to the invention, the rolling method includes the following steps of:

- aligning the first, second and third receiving slots of the rolling device along the same vertical plane P,
- introducing the sheet into the main casing, through the first, second and third receiving slots of the rolling device up to the stop surface,
- rotating the adjustment wheel of the rotary element in a predetermined direction until the sheet is fully inserted into the rolling device,
- translating the sliding element of the device up to the open position of the main casing of the rolling device, and
- expelling the rolled sheet from the rolling device.

The rolling method according to the invention makes it possible to roll a sheet of paper or cardboard individually, that is, one sheet at a time.

The invention and its different applications will be better understood upon reading the following description and upon examining the accompanying figures.

BRIEF DESCRIPTION OF THE FIGURES

Further advantages and characteristics of the invention will become apparent upon reading the following description, illustrated by the figures in which:

FIG. 1 is a perspective view of a rolling device according to the invention comprising a main casing, a sliding element and a rotary element, in the closed position of the main casing;

FIG. 2 is a perspective view of the main casing of the rolling device according to a first embodiment;

FIG. 3 is a perspective view of the sliding element of the rolling device;

FIG. 4 is a perspective view of the rotary element of the rolling device according to a first embodiment;

FIG. 5 is a partial longitudinal cross-sectional view of the rolling device, in the open position of the main casing, in which a sheet is rolled;

FIG. 6 is a transverse cross-sectional view of the rolling device in FIG. 1, into which a sheet is introduced;

FIG. 7 is a transverse cross-sectional view of the rolling device in FIG. 2, in which a sheet is rolled;

FIG. 8 is a transverse cross-sectional view of a sheet rolled by the rolling device in FIG. 2;

FIG. 9 is a transverse cross-sectional view of the rolling device according to a second embodiment of the invention, into which a sheet is introduced;

FIG. 10 is a transverse cross-sectional view of the rolling device according to a third embodiment of the invention, into which a sheet is introduced.

DETAILED DESCRIPTION

An exemplary embodiment of a rolling device according to the invention is described in detail below, with reference to the appended drawings. This example illustrates the characteristics and advantages of the invention.

Unless otherwise specified, a same element appearing in different figures has a single reference.

For the purposes of understanding the invention, the vertical, longitudinal and transverse orientations will be adopted according to the reference frame V, L, T indicated in the figures, the longitudinal L and transverse T axes of which extend in a horizontal plane. The rear of the device towards the front of the rolling device is oriented along the longitudinal axis L of the reference frame VLT.

FIG. 1 illustrates a paper or cardboard rolling device 10 including:

- a main casing 12 which extends along a longitudinal axis X parallel to the longitudinal axis L of the reference frame VLT between a front face 14 and a rear face 16,
- a sliding element 48 translationally movably mounted along the longitudinal axis X in the main casing 12, from the front face 14 of the main casing 12, between an open position and a closed position of the main casing 12, and
- a rotary element 86 rotatably movably mounted along the longitudinal axis X.

Advantageously, the sliding element 48 and the rotary element 86 are removable relative to the main casing 12 of the rolling device 10, in a translational movement along the longitudinal axis X.

FIGS. 2 to 7 represent the rolling device according to a first embodiment, FIG. 9 is a representation of the rolling device according to a second embodiment and FIG. illustrates the rolling device according to a third embodiment.

The main casing 12 as represented in isolation in FIG. 2 comprises:

- a base 28 transversely delimited by two lateral edges 29,
- an external cap 18 which comprises a lower portion 20 and a rounded upper portion 22, the lower portion 20 being the portion closest to the base 28 and the upper portion 22 being the portion furthest from the base 28,
- a first receiving slot 24 arranged in the upper portion 22 of the cap 18,
- a support 30 for rolling the sheet 106 arranged from the base 28 and having a rounded shape, the convex face of which is oriented towards the cap 18,
- two first guide rails 38 for translational guiding along the longitudinal axis X, each comprising a front end 40 equipped with a blocking abutment 42, and
- a positioning mark 26 arranged on the cap 18. The base 28 and the cap 18 structurally form the outside of the main casing 12 in which the support 30 and the first guide rails 38 are arranged.

According to the first embodiment of the invention, the support 30 comprises a holding groove 32 including a stop surface 104. The holding groove 32 divides the support 30 into a first and a second part 34, 36 symmetrical relative to a vertical plane P comprising the longitudinal axis X.

The first receiving slot 24 is rectangular and defined by its longitudinal length and transverse width.

Each first guide rail 38 is arranged opposite a lateral edge 29 of the base 28 and is raised relative to the base 28 so as to leave a free space for receiving part of the sliding element 48 inside the main casing 12. According to one alternative not represented of this exemplary embodiment, the main casing 12 comprises a single first guide rail 38.

The main casing 12 comprises a notch 44 arranged in the cap 18 forming an opening from the front face 14 of the main casing 12 for receiving part of the sliding element 48 inside the main casing 12.

As illustrated in FIGS. 1 and 2, the main casing 12 comprises an arrow 27 represented on the cap 18 to indicate to the user the direction of introduction of the sheet 106 into the main casing 12.

The sliding element 48 as represented in isolation in FIG. 3 comprises:

- a shell 50 which extends along the longitudinal axis X between a front edge 52 and a rear edge 54 and which comprises an open lower portion 56 divided into two lateral sides 57 and a rounded upper portion 58,
- a second receiving slot 60 arranged in the upper portion 58 of the shell 50 and delimited transversely by two longitudinal sides 62,
- a wall 72 for closing the front face 14 of the main casing 12 arranged to bear against the front edge 52 of the shell 50,
- a stud 74, visible in FIG. 5, arranged in the closing wall 72 and which extends along the longitudinal axis X, and
- two second guide rails 76 for translational guiding along the longitudinal axis X, each comprising a rear end 78 equipped with a blocking abutment 80.

The shell 50 includes two elastic blades 64 arranged on either side of the second receiving slot 60 and each comprising a free end 66 arranged opposite the second receiving slot 60. The shell 50 may comprise a single elastic blade 64 arranged on one side of the second receiving slot 60.

According to one alternative, not represented, of the shell 50, the free end 66 of each elastic blade 64 forms one of the two longitudinal sides 62 of the second receiving slot 60. The shell 50 may comprise a single elastic blade 64 arranged on one side of the second receiving slot 60, the free end 66 of which forms one longitudinal side 62 of the second receiving slot 60. The other longitudinal side 62 is formed directly by the shell 50.

As illustrated in FIGS. 6 and 7, the free end 66 of the elastic blade 64 includes a rim 70 which extends radially towards the longitudinal axis X. Preferably, the free end 66 is at an angular distance D within the range ]0-45[ degrees relative to the vertical plane P. Each elastic blade 64 is made, for example, by a partial cut-out of the shell 50.

The rear edge 54 of the shell 50 is in the shape of an arc of a circle and comprises:

- a shoulder 83 which extends radially towards the longitudinal axis X up to an inner peripheral wall 84 so as to reduce the diameter of the rear edge 54, and
- two projections 85 arranged on the peripheral wall 84 of the shoulder 83, on each lateral side 57 of the lower portion 56 of the shell 50.

Each second guide rail 76 of the sliding element 48 is configured to cooperate with a first guide rail 38 of the main casing 12 between an open position and a closed position of the main casing 12. Each blocking abutment 80 of the second guide rails 76 is configured to cooperate with a blocking abutment 42 of the first guide rails 38 to stop translation of the sliding element 48 in the main casing 12 in an open position of the main casing 12.

Each second guide rail 76 is arranged from a lateral side 57 of the lower portion 56 of the shell 50. According to one alternative not represented of this exemplary embodiment, the sliding element 48 comprises a single second guide rail 76.

The sliding element 48 comprises two gripping zones 82 arranged on either side of the shell 50 and adjacent to the closing wall 72. Each gripping zone 82 of the sliding element 48 is intended to be received into a notch 44 of the cap 18 of the main casing 12.

The rotary element 86 as represented in isolation in FIG. 4 comprises:

- a cylindrical shaft 88 which extends along the longitudinal axis X between a first and a second end 90, 92,
- a third receiving slot 94 arranged in the shaft 88 and open up to its second end 92,
- an adjustment wheel 100 integral with the first end 90 of the shaft 88, and
- a positioning mark 102 arranged on the adjustment wheel 100.

The second end 92 of the shaft 88 comprises a blind hole 98 which extends along the longitudinal axis X and configured to cooperate with the stud 74 of the closing wall 72 of the sliding element 48.

According to the first embodiment of the invention illustrated in FIG. 4, the third receiving slot 94 of the rotary element 86 is a radial through slot.

As illustrated in FIGS. 6 and 7, the third receiving slot 94 has two chamfers 96 which extend along the longitudinal axis X. Preferably, each chamfer 96 is at an angular distance D1 within the ]0-45[ degrees interval relative to the vertical plane P.

Preferably, the distance between the two projections 85 of the shoulder of the rear edge 54 of the shell 50 of the sliding element 48 is equal to the diameter of the shaft 88 of the rotary element 86. The projections 85 make it possible to pull the rolled sheet 106 during translation of the sliding element 48 towards the open position of the main casing 12 until the sheet 106 is expelled from the rolling device 10.

According to one alternative not represented, the diameter of the shoulder 83 of the rear edge 54 of the shell 50 of the sliding element 48 is equal to the diameter of the shaft 88 of the rotary element 86. In this case, the rolled sheet 106 is pulled directly by the shoulder 83 during translation of the sliding element 48. In addition, the peripheral wall 84 of the shoulder is smooth and has no projections 85.

As illustrated in FIGS. 1 and 4, the rotary element 86 comprises an arrow 103 represented on the adjustment wheel 100 to indicate the direction of rotation of the adjustment wheel 100 to the user.

In a mounted and open position of the rolling device 10 as represented in FIG. 5:

- the shell 50 of the sliding element 48 is configured to be housed inside the main casing 12, from the front face 14 of the main casing 12, and
- the shaft 88 of the rotary element 86 is configured to be housed inside the main casing 12, from the rear face 16 of the main casing 12 visible in FIG. 2.

The arrangement of the different elements in the closed position of the rolling device 10, as represented in FIGS. 6 and 7, is as follows:

- the upper portion 58 of the shell 50 and the free end 66 of the elastic blade 64 of the shell 50 of the sliding element 48 face the shaft 88 of the rotary element 86 and are positioned above the shaft 88 along the vertical axis V, and
- the support 30 of the main casing 12 and the stop surface 104 face the shaft 88 of the rotary element 86 and are positioned below the shaft 88 along the vertical axis V.

The arrangement of the receiving slots 24, 60 and 94 in the closed position of the rolling device is as follows:

the first and second receiving slots 24, 60 are aligned along the same vertical plane P, the second receiving slot 60 is arranged between the first receiving slot 24 and the shaft 88 of the rotary element 86 along the vertical axis V, and the first and second receiving slots 24, 60 are aligned with the holding groove 32 along the same vertical plane P.

When the mark 26 of the main casing 12 and the mark 102 of the rotary element 86 are aligned with each other, the third receiving slot 94 of the rotary element 86 is aligned with the first and second receiving slots 24, 60 along the same vertical plane P. The alignment of the three receiving slots 24, 60 and 94 is required to introduce the sheet 106 inside the rolling device 10.

In addition, when the marks 26, 102 are aligned with each other, the free end 66 of the elastic blade 64 of the shell 50 of the sliding element 48 is aligned with the chamfer 96 of the third receiving slot 94 of the rotary element 86 by the same angular distance D, D1 relative to the vertical plane P. This angle formed by the free end 66 and the chamfer 96 facilitates folding of the sheet 106 during rolling.

The unrolled sheet 106 represented in FIG. 6 extends between a first and a second end 108, 110 defining its length.

FIG. 8 illustrates the sheet 106 rolled into the shape of a cylinder by the rolling device 10 according to the invention comprising:

the first end 108 inside the rolled sheet 106 and the second end 110 outside the rolled sheet 106, an inner partition 112 which extends along the entire diameter of the cylinder of the rolled sheet 106, and a folded zone 114 comprising the first end 108.

The internal partition 112 is configured to reinforce the rolled sheet 106 so as to limit crushing thereof and also to improve filtering capacity of the rolled sheet 106. The folded zone 114 bears against an inner segment 116 of the rolled sheet 106.

According to one alternative embodiment of the sheet 106, the folded zone 114 is first size-coated so that the folded zone 114 is attached by sizing against the inner segment 116 to hold the sheet 106 in the rolled position. The so-called pre-size-coated folded zone 114 of the sheet 106 includes a layer of size deposited before the sheet 106 is rolled.

According to a second embodiment of the invention represented in FIG. 9, the third receiving slot 94 is a radial through slot and the support 30 of the main casing 12 includes a continuous stop surface 104. The geometry of the support 30 in this embodiment is simplified due to the absence of a holding groove 32.

According to a third embodiment of the invention represented in FIG. 10, the third receiving slot of the rotary element extends only along a portion of the diameter of the shaft 88 of the rotary element 86 and includes the stop surface 104. The geometry of the support 30 in this embodiment is simplified due to the absence of the holding groove 32.

The method for rolling a sheet 106 of paper or cardboard with the use of a rolling device 12 according to the invention by a user includes the following successive steps of:

1 Mounting the sliding element 48 with the main casing 12 by the user by inserting the shell 50 of the sliding element 48 from the front face 14 of the main casing 12;

2 Mounting the rotary element 86 with the main casing 12 by the user by inserting the shaft 88 of the rotary element 86 from the rear face 16 of the main casing 12;

3 Aligning the mark 102 of the rotary element 86 with the mark 26 of the main casing 12 by rotating the adjustment wheel 100 of the rotary element 86;

If the selected sheet 106 includes a pre-size-coated zone:

5 Locating the face including the pre-size-coated zone of the sheet 106, and orienting the sheet 106 so that the face including the pre-size-coated zone faces the arrow 27 of the main casing 12 and engaged first in the receiving slots 24, 60, 94;

If the selected sheet 106 does not include a pre-size-coated zone: switching from step 4 to step 6 without performing step 5.

6 Introducing the first pre-size-coated end 108 of the sheet 106 into the main casing 10, through the first, second and third receiving slots 24, 60, 94 until the sheet 106 abuts against the stop surface 104;

If the sheet 106 has a pre-size-coated zone:

7A Rotating the adjustment wheel 100 of the rotary element 86 by the user in a direction indicated by the arrow 103 of the adjustment wheel 100 of the rotary element 86;

If the selected sheet 106 does not include a pre-size-coated zone:

7B Rotating the adjustment wheel 100 of the rotary element 86 by the user in a direction randomly determined by the user; and 8 Translating the sliding element 48 to the open position of the main casing 12 of the rolling device 10 and contact of the blocking abutments 42 and 80 corresponding to the complete opening of the main casing.

After performing steps 1 and 2, the main casing 12 is in a closed position and the first and second receiving slots 24, 60 are aligned along the vertical plane P. Following step 3, the third receiving slot 94 is aligned with the first and second receiving slots 24, 60 of the rolling device 10.

For steps 7A and 7B, the adjustment wheel 100 is rotated until the second end 110 of the sheet 106 is inserted into the rolling device 10, and then the adjustment wheel 100 is rotated by at least one additional revolution to ensure that the sheet 106 is completely rolled about the shaft 88 of the rotary element 86.

During step 7A or 7B of rotating the adjustment wheel 100 of the rotary element 86, the third receiving slot 94 of the rotary element 86 drives the sheet 106 guided by the convex shape of the support 30 of the main casing 12 and held bearing against the shaft 88 of the rotary element 86 by the free end 66 of the elastic blade 64 of the shell 50 of the sliding element 48.

Preferably, step 8 of translating the sliding element is carried out by the user by applying pressure to each of the two gripping zones 82 of the sliding element 48 while holding the main casing 12.

During step 8 of translating the sliding element 48, the shoulder 83 of the rear edge 54 of the shell 50 of the sliding element 48 pulls the rolled sheet 106 until it is expelled from the rolling device 10 through the open lower portion 56 of the shell 50 of the sliding element 48.

According to the first embodiment of the rolling device 10, step 6 of introducing the first end 108 of the sheet 106 is carried out up to the holding groove 32 including the stop surface 104. As a result, at start of step 7A or 7B of rotating the wheel 100 of the rotary element 86, the first end 108 of the sheet 106 is held in the holding groove 32 to form the folded zone 114 of the rolled sheet 106.

According to the second embodiment of the invention, step 6 of introducing the first end 108 of the sheet 106 is carried out up to the support 30 including the stop surface 104. The sheet 106 rolled according to this embodiment does not include a folded zone 114.

According to the third embodiment of the invention, step 6 of introducing the first end 108 of the sheet 106 is performed up to the third receiving slot 94 including the stop surface 104. The sheet 106 rolled according to this embodiment does not include a folded zone 114 and the inner partition 112 extends only along a portion of the diameter of the cylinder of the rolled sheet 106.

The use of a rolling device 10 according to the invention in the form of a handheld device with a small overall size offers one alternative to manually rolling the sheet 106. Such a device is configured to individually form filters and for obtaining filters for roll-your-own cigarettes all having a similar geometry and more particularly a substantially identical diameter determined by the size of the diameter of the shaft 88 of the rotary element. In addition, the presence of a third slot 94 for receiving the rotary element 86 first enables the sheet 106 to be driven during rotation of the adjustment wheel 100 of the rotary element 86, but also the inner partition 112 to be formed, which rigidifies structure of the rolled sheet 106 and improves filtering capacity of the rolled sheet 106 when used in a roll-your-own cigarette.

The invention claimed is:

1. A rolling device for a sheet of paper or cardboard, comprising:
- a main casing which extends along a longitudinal axis between a front face and a rear face and comprising an external cap which includes a first receiving slot,
- a sliding element translationally movably mounted along the longitudinal axis in the main casing, from the front face of the main casing, between an open position and a closed position of the main casing, the sliding element comprising:
  - a shell which extends along the longitudinal axis between a front edge and a rear edge and comprising a rounded upper portion including a second receiving slot, and
  - a wall for closing the front face of the main casing,
- a rotary element rotatably movably mounted along the longitudinal axis and comprising:
  - a cylindrical shaft delimited between a first and a second end and housed inside the main casing, from the rear face of the main casing, the shaft including a third receiving slot open up to its second end, and
  - an adjustment wheel integral with the first end of the shaft,
  - a stop surface;

in the closed position of the rolling device:
- the first and second receiving slots are aligned along a same vertical plane comprising the longitudinal axis,
- the second receiving slot is arranged between the first receiving slot and the shaft of the rotary element along a vertical axis, and
- the rounded upper portion of the shell of the sliding element is arranged opposite the shaft of the rotary element.

2. The rolling device according to claim 1, wherein the third receiving slot of the rotary element is a radial through slot.

3. The rolling device according to claim 2, comprising a support including the stop surface facing the first slot.

4. The rolling device according to claim 2,
- comprising a support in which a holding groove including the stop surface facing the shaft of the rotary element is arranged,
- and wherein the holding groove is aligned with the first and second receiving slots along the same vertical plane.

5. The rolling device according to claim 1, wherein the third receiving slot of the rotary element extends only along a portion of the diameter of the shaft of the rotary element and includes the stop surface.

6. The rolling device according to claim 1, wherein:
- in that the closing wall of the sliding element includes a stud cooperating with a blind hole arranged at the second end of the shaft of the rotary element,
- and in that the stud and the hole are aligned along the longitudinal axis.

7. The rolling device according to claim 1, wherein the main casing includes at least one first rail for translational guiding along the longitudinal axis cooperating with at least one second guide rail of the sliding element.

8. The rolling device according to claim 1, wherein at least one of the first and second guide rails includes an abutment for translational blocking.

9. The rolling device according to claim 1, wherein the shell of the sliding element includes at least one elastic blade comprising a free end arranged opposite the shaft of the rotary element.

10. The rolling device according to claim 9, wherein:
- the second slot of the sliding element is delimited by two longitudinal sides,
- and the free end of the elastic blade forms one of the two longitudinal sides of the second receiving slot.

11. The rolling device according to claim 10, wherein the free end of the elastic blade is at an angular distance in the ]0-45 [ degrees interval relative to the vertical plane.

12. The rolling device according to claim 1, wherein:
- the main casing and the rotary element each have a positioning mark,
- and when the marks are aligned, the third receiving slot of the rotary element is aligned with the first and second receiving slots along the same vertical plane.

13. The rolling device according to claim 1, wherein the rear edge of the shell of the sliding element comprises a shoulder which extends radially towards the longitudinal axis and the inner diameter of which is equal to the diameter of the shaft of the rotary element.

14. The rolling device according to claim 1, wherein the shell of the sliding element includes an open lower portion.

15. A method for rolling a sheet of paper or cardboard with the use of a rolling device according to claim 1, the rolling method comprising:
- aligning the first, second and third receiving slots of the rolling device along the same vertical plane,
- introducing the sheet into the main casing, through the first, second and third receiving slots of the rolling device up to the stop surface,
- rotating the adjustment wheel of the rolling device in a predetermined direction until the sheet is fully inserted into the rolling device, and
- translating the sliding element up to the open position of the main casing of the rolling device, and
- expelling the rolled sheet from the rolling device.

* * * * *